(12) United States Patent
Chen et al.

(10) Patent No.: US 6,496,578 B1
(45) Date of Patent: Dec. 17, 2002

(54) INTEGRATED TELECOMMUNICATIONS SERVICES FOR MOBILE AND LANDLINE TELEPHONY SERVICE SUBSCRIBER

(75) Inventors: Hwei-Ling Chen, Cary, NC (US); Sanjay G. Bhatia, Raleigh, NC (US); William D. Gentry, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/237,750

(22) Filed: Jan. 26, 1999

(51) Int. Cl.[7] .............................................. H04M 3/42
(52) U.S. Cl. ........................... 379/211.02; 379/210.02; 455/415
(58) Field of Search ....................... 379/211.02, 211.01, 379/212.01, 201.01, 201.02, 201.03, 210.02, 207.15, 219, 220.01; 455/432, 433, 439, 445, 461, 465, 415

(56) References Cited

U.S. PATENT DOCUMENTS

| | | | |
|---|---|---|---|
| 5,329,578 A | * | 7/1994 | Brennan et al. .......... 379/88.19 |
| 5,548,636 A | * | 8/1996 | Bannister et al. ....... 379/390.01 |
| 5,802,160 A | * | 9/1998 | Kugell et al. ................ 379/211 |
| 5,978,672 A | * | 11/1999 | Hartmaier et al. .......... 455/413 |
| 6,011,975 A | * | 1/2000 | Emery et al. ................ 379/230 |

* cited by examiner

Primary Examiner—Ahmad F. Matar
Assistant Examiner—Benny Q. Tieu

(57) ABSTRACT

A system, method, and apparatus are provided to deliver integrated call screen list based telephony services for a subscriber having both landline and mobile wireless telephone terminals. Call screen list based services are selectively provided to a landline or mobile wireless telephone terminal for which an incoming call is being received. These services can be coordinated and integrated between the landline and mobile wireless telephone terminals in various telephony topologies. For example, services can be integrated when the landline and mobile wireless telephone terminals are operably connected to separate mobile and landline telecommunications switching infrastructures or to a common integrated landline and wireless telecommunications switch. One or more call screen lists may be used to define integrated call screen list based services for landline and wireless telephone terminals.

39 Claims, 6 Drawing Sheets

INTEGRATED TELECOMMUNICATIONS SERVICES FOR MOBILE AND LANDLINE TELEPHONY SERVICE SUBSCRIBER

FIELD OF THE INVENTION

The present invention relates to mobile and landline telecommunications services, and more particularly to selectively integrating call screen list based telephony services for subscriber having both mobile wireless and landline telephone terminals.

BACKGROUND GROUND OF THE INVENTION

Originally, telecommunications was supported through traditional landline based telephony technology. To insure consistency between numerous landline telephony systems, well defined standards, protocols, and topologies were developed over time. More recently, wireless telephony as developed as an alternative means of telecommunications. However, wireless telephony evolved with its own separate and distinct standards, protocols, and topologies optimized for the mobile telephony environment. In addition, landline and mobile telecommunications each developed their own separate and distinct networks and switching infrastructures.

Interfaces have been developed between the landline and mobile telephony networks, allowing subscribers of the respective networks to communicate. Initially, special purpose equipment served to interconnect these independent networks. Recently. telecommunications switches Were developed that could interoperatc in both landline and mobile networks. However,duplicate telephony switches and networks are still pervasive. As a result, subscribers of both landline and mobile telephony services are often serviced by different telephony switches and networks depending on whether subscribers are receiving landline or mobile wireless telephony services.

Subscribers must therefore interface separately with landline and mobile telephony networks to activate and configure the respective telephony services provided by each network. Separate activation and configuration of landline and wireless telephony services occurs even with modern integrated landline and wireless telephony switches. While user interfaces are provided to subscribers of the respective networks for configuring telephony services, telephony services provided to subscribers of both landline and mobile telecommunications networks are not delivered in an integrated manner. No coordination exists between the landline and mobile wireless facilities that provide common telephony services. As a result, subscribers to both landline and mobile telephony services can encounter problems obtaining the desired telephony services, particularly with respect to incoming call screening, incoming call acceptance, incoming call rejection, incoming call forwarding, and related telephony services.

In this regard, incoming call screening and incoming call acceptance services are generally defined by a call screen list associated with a particular telephone number. Presently, separate call screen lists are required to define these services for mobile and landline telephony subscribers respectively. Telephony service subscribers must activate, configure, and deactivate these lists individually in each network. For instance, to customize call screen list call blocking services, a customer would first configure an incoming call screen list managed for their mobile telephone by the mobile network through a first user interface provided by that network. Subsequently, if that customer also desired to customize call screening services for their wired home telephone, they would also have to configure an incoming call screen list managed by the landline network for their landline telephone through a different user interface provided by that network.

As a result, subscribers may be inconvenienced by the redundant management and configuration of telephony services for their mobile and landline telephones. Because the interfaces for managing mobile and landline are separate and different, a subscriber may be unable or unwilling to configure call screen list based services as desired. Confusion may result, since a subscriber may lose track of the services to be provided for each respective telephone.

In addition, subscribers could lose calls and messages because their call screening services are not coordinated. For example, a family member whose calls are always accepted by a landline telephone may be unintentionally screened from calling a mobile telephone, if the subscriber forgot to configure the call screen list for their mobile telephone to identify calls from the family member as telephone calls that should always be accepted. Alternatively, subscribers may be contacted by callers to whom they did not wish to speak. For instance, a harassing caller blocked from calling a mobile telephone may be accidentally omitted from the call blocking screen list of a landline telephone. Even if both call screen lists were configured as desired by the subscriber, it is not possible to automatically integrate and coordinate the delivery of services between the mobile and landline telephony systems. For example, it is not practical for a subscriber to configure call blocking or acceptance services to be delivered automatically according to the combination of their mobile and landline call screen lists.

While various call screening and call acceptance services are available for mobile telephony service subscribers and landline telephony service subscribers, a need still exists for improved call screening and call acceptance services. A need to resolve the foregoing problems faced by subscribers of both mobile and landline telephony services also exist. In addition, it would be advantageous to provide additional call screening and call acceptance services to telephony service subscribers.

SUMMARY OF THE INVENTION

The present invention provides improved and additional call screen list based services for subscribers of landline and mobile wireless telephone terminals by selectively integrating the various call screen list based services. According to one embodiment of the present invention, a method is provided which receives a telephone call intended for a first telephone terminal which may be a mobile or landline telephone terminal, analyzes each call screen list associated with mobile and landline telephone terminals of a subscriber, and provides telephony services to the telephone terminal receiving a telephone call according to the analysis of each call screen list. The method can determine whether the first telephone terminal being called is subscribed to receive call screen list based services. In addition, the method can determine to which call screen list based services the telephone terminal receiving the call is subscribed. The method can either logically associate or logically twin mobile and landline telephone terminals to provide call screen list based services. As such, the method of this embodiment selectively integrates call screen list based services for a subscriber having both mobile and landline telephony services.

The present invention further provides a system for selectively integrating call screen list based telephony services for a subscriber having both mobile and landline telephony services. The system comprises a first telecommunications switch, a memory device, and a telephony service device. The first telecommunications switch receives a telephone call intended for a first telephone terminal of the plurality of mobile and land line telephone terminals of a subscriber. The memory device stores each call screen list associated with the mobile and landline telephone terminals of the subscriber which define the call screen list based telephony services to be provided. Finally, the telephony service device analyzes each call screen list and accordingly provides telephony services to the first telephone terminal of the subscriber based upon the call screen list based services defined for the mobile and landline telephone terminals. Services are provided based upon at least one call screen list defining call screen list based services for at least one telephone terminal of the subscriber. These services are provided irrespective of which type of telephone terminal of the subscriber is the first telephone terminal receiving the incoming telephone call.

In one embodiment, the first telecommunications switch and the telephony service device are disposed within a single integrated telecommunications switch for servicing both mobile and landline telephone terminals. In another embodiment, the telephony service device can be a second telecommunications switch operably connected to the first telecommunications switch. In addition, the system can include a subscriber user interface for managing call screen list based telephony services for mobile and landline telephone terminals.

The present invention further provides an apparatus having a first interface, a memory device, and a computer processor for selectively providing integrated call screen list based telephony services to a subscriber having both mobile and landline telephone terminals. The first interface receives requests to provide call screen list based telephony services to a first telephone terminal of a subscriber receiving an incoming telephone call. The memory device stores each call screen list associated with telephony services to be provided to the mobile and landline telephone terminals of a subscriber. The computer processor executing software accesses and analyzes each call screen list associated with the mobile and landline telephone terminals. Call screen list based services are selectively provided to the first telephone terminal receiving the telephone call according to the analysis of each call screen list.

The present invention further provides an apparatus for selectively requesting integrated call screen list based telephony services for a subscriber having both mobile and landline telephony services. The apparatus comprises a first interface, a second interface, a memory device, and a computer processor. The first interface receives telephone calls intended for a first telephone terminal of the subscriber, while the second interface sends requests for call screen list based telephony services to be provided to the first telephone terminal. The memory device is operably connected to the computer processor and the first and second interfaces. Further, the memory device stores each call screen list associated with call screen list based telephony services provided to the telephone terminals of the subscriber. The computer processor executing software is operably connected to the memory device, and can access and analyze each call screen list. Thus, call screen list based telephony services are provided to the first telephone terminal of the subscriber according to an analysis of each call screen list.

The various embodiments of the present invention provide coordination and selective integration of call screen list based telephony services for the mobile wireless and landline telephone terminals of a subscriber. The inconvenience and unpredictability of managing these services separately for mobile and landline telephone terminals of a subscriber are therefore minimized.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Although specific terms are employed herein, they are used in a generic and descriptive sense only and not for purposes of limiting the scope of the present invention in any way.

Figure 1:
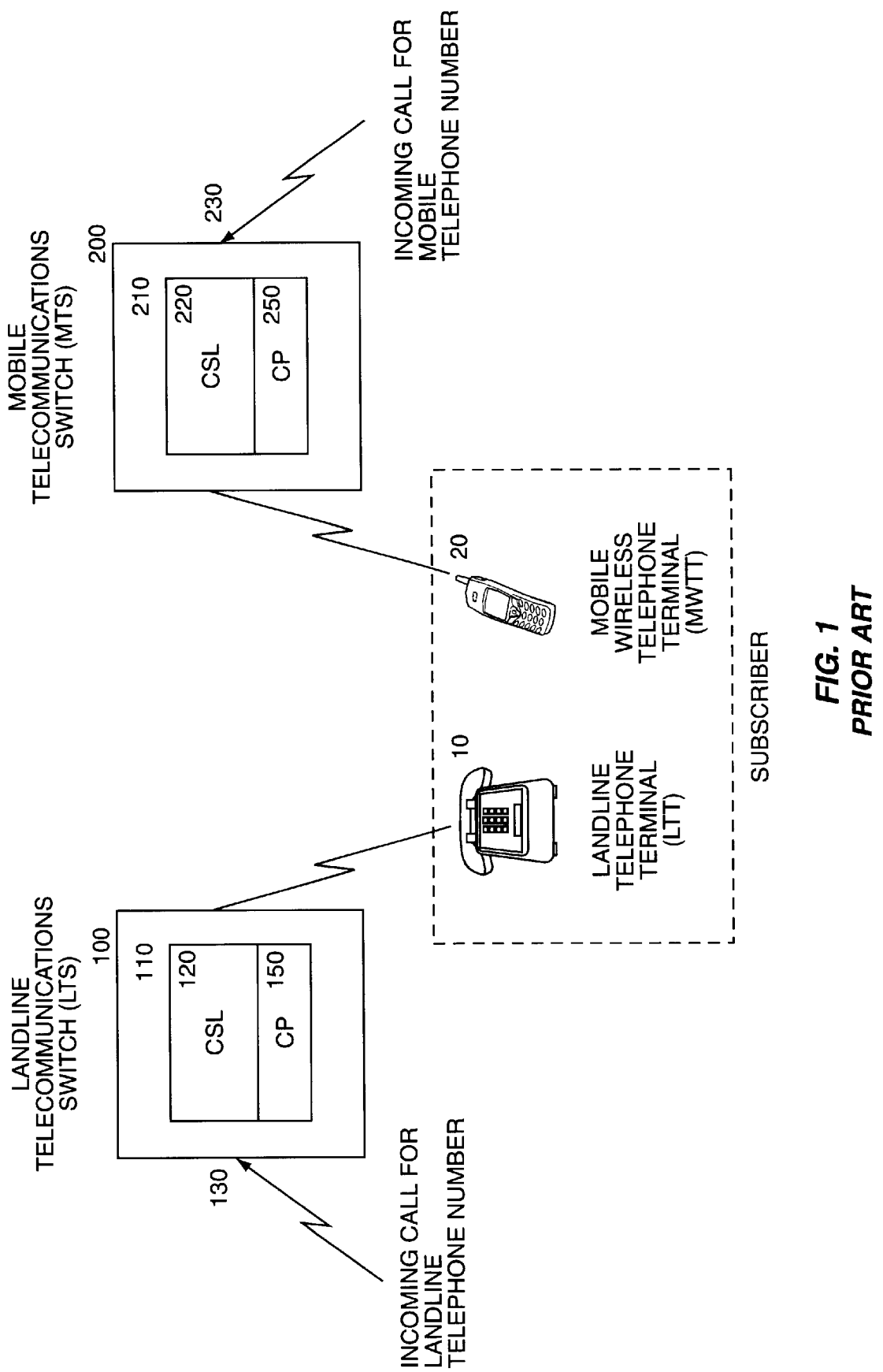
FIG. 1 is a block diagram illustrating the separate telecommunications infrastructures traditionally found for landline and mobile wireless telephone terminals.

As described above, landline based telecommunications developed significantly earlier than mobile wireless telecommunications. Two separate and distinct telephony infrastructures evolved independently and each provided telephony services to their respective subscribers. As is shown in FIG. 1, a landline telephone terminal (LTT) 10 is interconnected to a landline telecommunications switch (LTS) 100. The landline telephone terminal can communicate with other telephone terminals that are identified by unique telephone numbers via a telecommunications network that is accessed through the landline telecommunications switch associated with the landline telephone terminal. Correspondingly, incoming telephone calls can be routed by the telecommunications network to the proper switch and ultimately to the intended telephone terminal. In addition to receiving and making telephone calls, the landline telephone terminal also receives other telephony services from the landline telecommunications switch, such as call waiting, caller identification, and call screening.

The wireless telecommunications system developed later in time with its own separate and distinct telephony infrastructure. Technological differences between landline and wireless communications systems discouraged commonality between the landline and wireless telecommunications systems. As shown in FIG. 1, a mobile wireless telephone terminal (MWTT) 20 is interconnected to a mobile telecommunications switch (MTS) 200. As before, incoming telephone calls can be routed by the telecommunications network to the proper telecommunications switch and ultimately to tie intended telephone terminal. As with the landline telephone terminal, the mobile wireless telephone terminal also receives telephony services other than making or receiving telephone calls from the respective mobile telecommunications switch.

Despite these differences, the landline and mobile telecommunications systems each provide an interface to the backbone telecommunications network. This common connection establishes a link allowing landline and mobile telephone terminals to communicate. However, other telephony services are still provided separately to mobile and landline telephone terminals by the respective landline and wireless telecommunications networks. Among the other telephony services separately provided by mobile and landline networks are call screen list based services which permit incoming telephone calls made to a particular telephone terminal to be processed according to a predefined call screen list. The most common call screen list based services available for landline and mobile telephone terminals are detailed below. As shown in FIG. 1, a first call screen list (CSL) 120 is associated with landline telephone terminal 10. Typically, the CSL 120 is stored within a memory device 110 of the landline telecommunications switch 100. A computer processor 150 executing software is used to access, analyze, and process at least one CSL stored within the memory device. A separate call screen list (CSL) 220 is associated with the mobile wireless telephone terminal 20. Again, the separate CSL is stored within a memory device 210 of the mobile telecommunications switch 200. A computer processor 250 executing software is used to access, analyze, and process at least one CSL stored within the memory device. Typically the CSL associated with a mobile wireless telephone terminal is stored within an HLR (Home Location Register) database organized within the memory device 210. Optionally, the memory devices storing the respective call screen lists may be disposed outside the respective landline and mobile telecommunications switches.

Presently, call screen list based services are generally provided to the landline and mobile telephone terminals independently by their respective landline and mobile telecommunications switches with no coordination therebetween. For a particular landline or mobile wireless telephone terminal, call screen list based services are provided by a preselected telecommunications switch to which the telephone terminal receiving an incoming call is assigned. When an incoming call intended for a telephone terminal arrives at the assigned telecommunications switch, the call screen list associated with the telephone terminal being called is accessed by the telecommunications switch. Each call screen list is uniquely associated with a telephone terminal according to the telephone number assigned thereto. The incoming call is then processed and services are provided for the telephone terminal being called according to the corresponding call screen list. For instance, the screened incoming call may be rejected, accepted. forwarded, or otherwise processed according to preselected parameters stored in the call screen list.

In contrast to separately providing call screen list based services for the mobile and landline telephone terminals of a subscriber, the present invention provides a method and apparatus for providing integrated call screen list based services to landline and mobile wireless telephone terminals.

Introduction to the Present Invention

Discussion regarding the present invention will be facilitated by establishing some terminology to be used herein. The present invention defines a subscriber as a customer having at least one landline telephone terminal and at least one mobile wireless telephone terminal. At a minimum, the subscriber is assumed to have basic telephone service at each respective telephone terminal. Further, the present invention assumes that at least one of the subscriber'telephone terminals additionally subscribes to call screen list based telephony services.

Further, for simplicity the present invention refers to the first telephone terminal of the subscriber as the telephone terminal receiving an incoming telephone call. Further, the present invention refers to a second telephone terminal of the subscriber as the telephone terminal of the subscriber not presently receiving the incoming telephone call. The present invention assumes that the first and second terminals are different types of telephone terminals among the landline and mobile wireless telephone terminals of a subscriber. For instance, if the first telephone terminal called was a landline telephone terminal, then the present invention assumes that the second telephone terminal of the subscriber not intended to receive the incoming call is a mobile wireless telephone terminal. Clearly, the subscriber can have more than one telephone terminal of each type with respect to the present invention.

Processing an incoming call according to at least one call screen list will also be referred to as screening the incoming call, for purposes of the present invention. Screening can be applied to an incoming call irregardless of how the incoming call is processed with a call screen list and irregardless of what call screen list based services are provided to the incoming call. After an incoming call has been screened, the result is either terminating the call, forwarding the call, or setting up the incoming call.

In addition, an overview of the system according to the present invention provides a helpful foundation for detailed discussions about the present invention. An incoming call is received for a first telephone terminal of a subscriber having both landline and mobile wireless telephone terminals. At least one call screen list defining call screen list based telephony services to be provided to the landline and wireless telephone terminals is analyzed. Call screen list based services are applied to the incoming call intended for the first telephone terminal of the subscriber based on an analysis of at least one call screen list associated with both landline and mobile wireless telephone terminals of a subscriber. The call is ultimately forwarded or setup for the subscriber, or the call is terminated. One view of the present invention comprises a requester perspective and a server perspective for providing call screen list based services to the first telephone terminal of the subscriber receiving an incoming telephone call.

Requesting Apparatus and Serving Apparatus

Figure 2:
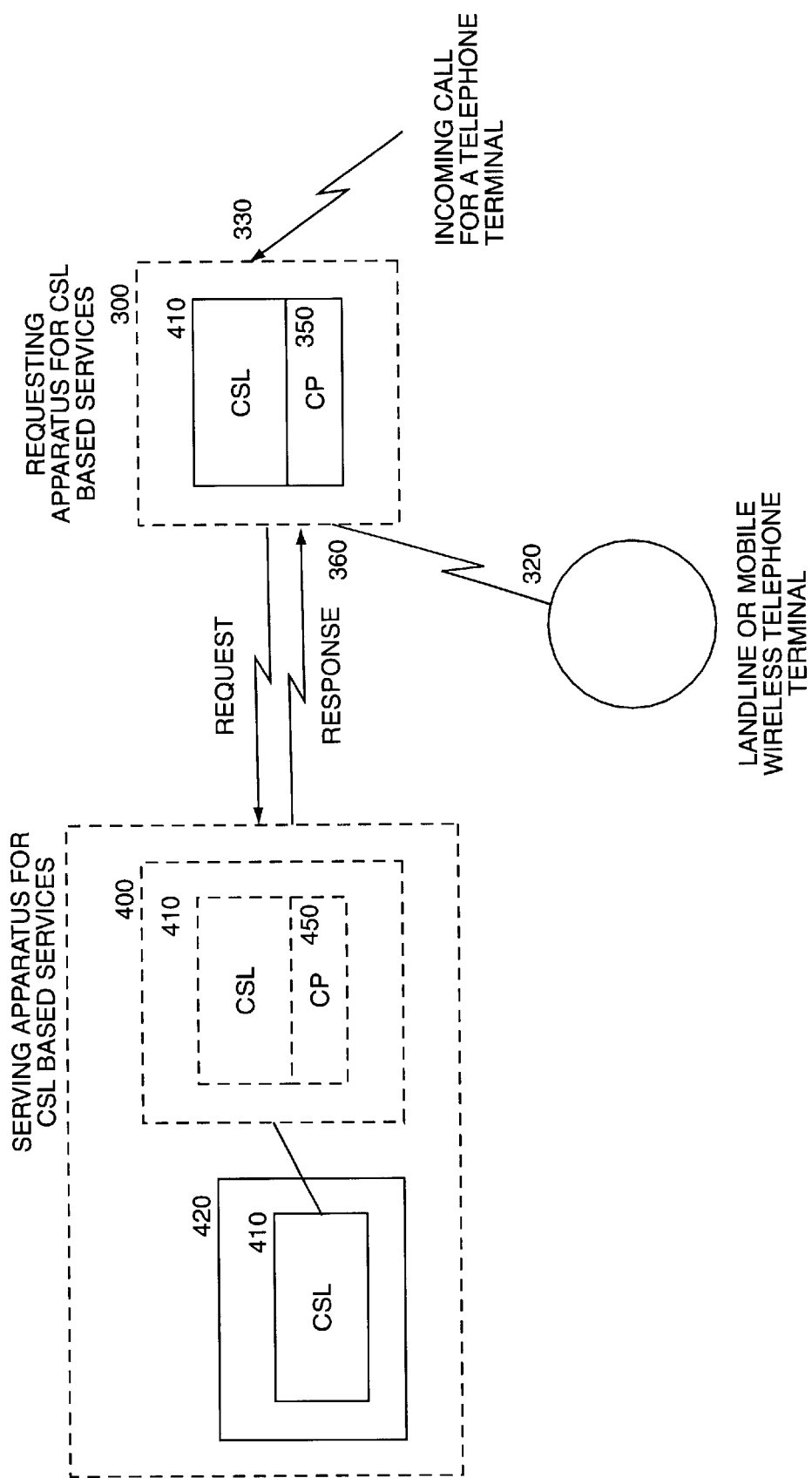
FIG. 2 is a block diagram illustrating the requesting apparatus and serving apparatus for providing integrated call screen list based telephony services, according to one embodiment of the present invention.

The present invention provides a requesting apparatus 300 that selectively requests integrated call screen list based services for a subscriber receiving an incoming telephone call. Details regarding the operation of the requesting apparatus are shown in FIG. 2. As shown, the subscriber has at least one landline telephone terminal and at least one mobile wireless telephone terminal. An incoming telephone call is received by the requesting apparatus 300 intended for a telephone terminal 320 of the subscriber. Telephone terminal 320 may comprise either a landline telephone terminal 10 or a mobile wireless telephone terminal 20 of the subscriber. The requesting apparatus 300 preferably comprises a terminal interface 360, such as a landline or mobile wireless telephone terminal interface. The telecommunications switch preferably corresponds to the type of telephone terminal receiving the incoming telephone call. For example, the telecommunications switch may be a landline, mobile, or integrated landline and mobile wireless telecommunications switch.

In operation, an incoming telephone call for a first telephone terminal is received by the requesting apparatus through the first interface 330. The requesting apparatus can be a landline telecommunications switch 100 if the first telephone terminal is a landline telephone terminal. Alternatively, the requesting apparatus can be a mobile telecommunications switch 200 if the first telephone terminal is a mobile wireless telephone terminal, if the first interface is an integrated landline and mobile telecommunications switch, however, the same switch can service either a landline or a mobile wireless telephone terminal.

The incoming telephone call is analyzed by the requesting apparatus to determine the telephone number of the originating telephone terminal, as well as the telephone number of the first telephone terminal that is being called. Optionally, the requesting apparatus can determine whether the telephone terminal being called is subscribed to integrated call screen list based services before requesting those services. Alternatively, the telephone number of the incoming call and the telephone number being called can be included in a transmitted message requesting call screen list based services. Regardless of where processing is performed, the requesting apparatus can request call screen list based services and/or processing in response to an incoming call intended for a telephone terminal serviced by the requesting apparatus.

The requesting apparatus 300 also preferably includes a memory device 410 which stores at least one call screen list (CSL). A computer processor 350 executing software is used to access, analyze, and process at least one CSL stored within the memory device. In a preferred embodiment, at least one call screen list is disposed outside the requesting apparatus 300. A CSL list may be disposed in a memory device within serving apparatus 400 connected through a local fiber or electrical bus, within an external device 420 located remotely but operably connected to the serving apparatus through a communications link, or within both. The external device 420 may be operably connected to the serving apparatus 400 through a network, such as an Intelligent Network, and Advanced Intelligent Network, and internet or packet based network, or a cell based ATM (Asynchronous Transfer Mode) network, as various options for storing call screen lists. As shown in FIG. 2, in another embodiment at least one call screen list used to process an incoming telephone call can be stored within the requesting apparatus 300. In addition, the present invention may utilize more than one call screen list for processing an incoming telephone call.

The requesting apparatus also includes a second interface 340, such as a communications link, for sending requests for telephony services or other processing for the landline or mobile wireless telephone terminal receiving the incoming telephone call. This second interface preferably is also used to receive responses to the requests, although a different interface could be used for receiving responses. The transmitted request could optionally include a call screen list maintained by the requesting apparatus for the telephone terminal being called. Alternatively, the request could simply transmit the originating telephone number, the called telephone number that uniquely identifies the subscriber, and a request for processing. Those skilled in the art will understand that the messaging required by the present invention may be carried out through various types and formats of messages, requests, and responses, including but not limited to IS41 and TCAP messages. The request transmitted by the requesting apparatus 300 is then processed by a serving apparatus 400.

As such, the present invention also provides a serving apparatus 400 for selectively providing integrated call screen services to landline and mobile telephone terminals of a subscriber. The serving apparatus is shown operably connected to the requesting apparatus 300 in FIG. 2. The serving apparatus 400 includes a first interface 440, such as a communications link, for receiving requests to provide call screen list based services from the requesting apparatus 300 for the telephone terminal of the subscriber receiving the incoming telephone call. Further, the serving apparatus includes a memory device 410 for storing at least one call screen list (CSL). The serving apparatus also includes a computer processor 450 executing software used to access, analyze, and process at least one CSL stored within the memory device.

In one embodiment, the serving apparatus 400 further comprises a second interface for providing telephony services to another telephone terminal of the subscriber, i.e., a different telephone terminal other than the telephone terminal receiving the incoming call. For example, this second interface could support a landline telephone terminal 10 or a mobile wireless telephone terminal 20 of a subscriber. Like the receiving apparatus, the serving apparatus 400 preferably comprises a telecommunications switch, such as a landline, mobile, or integrated landline and mobile wireless telecommunications switch depending upon the type of telephone terminal serviced by the serving apparatus. For instance, if the incoming call is for a mobile telephone, the requesting apparatus could be a mobile or integrated telecommunications switch. Further, the serving apparatus could be a landline or an integrated switch servicing a landline telephone of the subscriber. Those skilled in the art will appreciate that telephony devices other than a telecommunications switch could function as the serving apparatus 400. For example, the serving apparatus may be embodied as a network node within an Internet or packet based network, within a cell based ATM (Asynchronous Transfer Mode) network, or within an IN (Intelligent Network) or similar network.

As mentioned, the serving apparatus also includes a memory device 410 for storing at least one call screen list (CSL) associated with the mobile wireless or landline telephone terminals of the subscriber. As used within the present invention, the memory device could be any device for storing a list, including RAM, cache memory, disk, EEPROM, or nonvolatile storage device. The memory device 410 is operably connected to the first interface 330, the second interface 340, and the computer processor 450 of the serving apparatus 400. Those skilled in the art will appreciate that the memory device 410 could be disposed in the serving apparatus operably connected through a local electrical or optical bus, in an external device located remotely but operably connected to the serving apparatus through a communications link, or within both. Further, the memory device 410 could be disposed within the requesting apparatus, and operably connected via a bus or a communications link. In addition, the memory device can be disposed within more than one of the above mentioned apparatuses.

Regardless of where it is disposed, the memory device can store at least one call screen list.

In one embodiment, a single call screen list is associated with both landline and mobile wireless telephone terminals of the subscriber. As such, an incoming telephone call intended for either the mobile or telephone terminal of a subscriber will be processed based on the analysis of a single integrated call screen list, and call screen list based services will be provided accordingly. For instance, a subscriber may wish to block incoming calls from a given telephone number on both their mobile and landline telephone terminals according to a single call screen list. In addition, a subscriber may wish to accept calls from a given telephone number on a mobile telephone terminal from 8am to 5 pm , and may wish to accept calls from that same number on a landline telephone terminal from 5pm to 8am. Both of these services can be implemented through a single integrated call screen list. Those skilled in the art will understand that many different incoming call services and processing may be supported by a single call screen list associated with both landline and mobile wireless telephone terminals of a subscriber.

Another embodiment of the present invention provides at least two call screen lists. Preferably one call screen list could be associated with a landline telephone terminal, and another with the mobile wireless terminal of a subscriber. The lists could all be stored in a memory device disposed in the serving apparatus 400, or they could be partitioned between the serving apparatus 400 and the requesting apparatus 300. The various locations and operable connections of the memory device noted above apply equally in this embodiment. However, additional call screen lists could be used, such as to represent individual or grouped telephone terminals. In any event, the same call screen list based services can be provided regardless of the number and allocation of call screen lists. According to the present invention, incoming calls for landline and mobile wireless telephone terminals are processed after analyzing each call screen list associated with the landline and mobile wireless telephone terminals of a subscriber. Further, the call screen lists of a subscriber associated with landline and mobile telephone terminals respectively may be logically twinned or logically associated to one another. When twinned, one list may be selected to provide call screen list based services to both landline and mobile wireless telephone terminals of a subscriber. The selected call screen list can be statically preselected or may be dynamically selected according to conditions and circumstances existing when the incoming call is received. Further, two or more call screen lists may be logically associated to provide services according to information stored in the lists.

Numerous telephony services can utilize separate call screen lists. For example, services could be provided from one list or another, based on priority, time, date, the originating telephone number, or other conditions. For instance, a traveling subscriber could direct that incoming calls be processed according to a landline call screen list when in their home service area, but that roaming calls while traveling outside the home service area in another state be processed according to the mobile wireless call screen list. Those skilled in the art will appreciate that these services can also be implemented in a single call screen list without departing from the present invention.

The most common call screen list based services will now be described. A call screen list can be used to determine various methods for processing an incoming telephone call, regardless of whether a landline or mobile wireless terminal is being called. Those skilled in the art will appreciate that call screen list based services are not limited to those mentioned herein. Call screen rejection service, otherwise known as call blocking, allows a subscriber to prevent calls originating from a preselected telephone number from being received. For example, a subscriber may configure his landline telephone at home to not accept telephone calls from the telephone number of a harassing caller. Call screen acceptance service allows a subscriber to always accept calls originating from a predetermined telephone number. For example, a subscriber may configure her mobile wireless telephone to always accept calls from listed relatives.

Call screen selective forwarding allows a subscriber to forward incoming telephone calls from a predetermined telephone number to another telephone number. For example, a subscriber could configure their landline office telephone to forward calls from a particular telephone number to their secretary. Call screen selective voicemail forwarding allows a subscriber to forward incoming telephone calls from a predetermined telephone number to a voicemail or phonemail system. For instance, a subscriber can configure their mobile wireless telephone to forward calls from a news reporter's telephone to a voicemail system.

Further, a subscriber could use home/roam call screen services to process incoming calls to a mobile wireless telephone terminal. Calls can be screened and processed differently depending on whether a mobile wireless telephone is in its home service area or is roaming. For example, screening can vary depending on whether a subscriber was being called at home instead of away on a business trip. In addition, a variety of conditional call screen list based services can be provided. For example, an incoming call to a subscriber could be processed according to the date and time when the call is received. Further, a call could be blocked on a landline business telephone from 8am till 5pm, but accepted on a mobile wireless telephone at any time of day.

All call screen list based services mentioned above allow services to be applied to the telephone number that originated the last telephone call received by a telephone terminal. A subscriber can process the last received call according to any call screen list based service. For instance, a subscriber could add the last received call to a call screen rejection list in order to block future calls from the last telephone number that called the subscriber.

In addition, a user interface is provided to allow a subscriber of call screen list based services to define and configure call screen list based processing and services according to their desires. Thus, a subscriber can define the manner in which incoming telephone calls are processed for their landline and mobile telephone terminals. Preferably, the user interface is provided through the landline and/or mobile wireless telephone terminal of a subscriber that is operably connected to the requesting apparatus 300. The user interface is operable even for a mobile wireless telephone terminal roaming outside of the home service area. In this manner, the user interface may be implemented in various ways, including but not limited DTMF tones, menus or softkeys on the terminal, voice response units, voice recognition, or simply via telephone calls made to human support personnel. In the alternative, other user interfaces may be provided for configuring call screen list based services, for instance through email or an internet webpage. Further, the user interface could also be provided to the subscriber through serving apparatus 400 or through another telephony device, as described previously in the description of the serving apparatus.

Since each call screen list defined for the telephone terminals of a subscriber is analyzed prior to processing an incoming telephone call, the method and apparatus of the present invention operate regardless of whether the incoming telephone call is intended for a landline or mobile wireless telephone terminal of a subscriber. Call screen list based telephony services can be configured and provided to a landline telephone terminal, a mobile wireless telephone terminal, or to both telephone terminals of a subscriber.

Additionally, the method and apparatus of the present invention are not limited by the location of a memory device containing each call screen list. As shown in FIG. 2, for example, the memory device and call screen list may be disposed within the serving apparatus 400, or in an external device 420 operably connected to the serving apparatus 400. Further, more than one memory device may be used, and they may be distributed between the serving apparatus and the requesting apparatus. For example, the requesting apparatus can contain a call screen list for the first telephone terminal receiving the incoming telephone call, while the serving apparatus can contain a call screen list for a second telephone terminal of the subscriber not intended to receive the incoming telephone call.

Once a request for call screen list based services is received by the serving apparatus 400, the serving apparatus analyzes at least one call screen list associated with the serving apparatus and sends a response back to the requesting apparatus 300. The response can comprise call screen list based services applied to the incoming call, or post-processing information to be used by the requesting apparatus for providing call screen list based services. For instance, the call can be screened, or the requesting apparatus could be informed that the serving apparatus can not screen the call. The response can be instructions to the requesting apparatus regarding how to process the incoming call. For example, the requesting apparatus could be told to terminate the incoming call. The response from the serving apparatus 400 may be received by the requesting apparatus and analyzed together with a call screen list stored within the requesting apparatus 300 in order to process the incoming telephone call. In some cases, after receiving the response the requesting apparatus may have to provide call screen list based services to the telephone terminal being called. After a decision is made regarding managing the incoming call, the requesting apparatus then ultimately terminates, forwards, or sets up the incoming telephone call. For example, the call may be forwarded to a telephone terminal being called, or otherwise handled by the requesting apparatus after processing is completed. For instance, the requesting apparatus could ultimately block an incoming telephone call intended for a telephone terminal of the subscriber after the originating telephone number was found within a call screen rejection list.

An Integrated Requesting/Serving Apparatus

Figure 3:
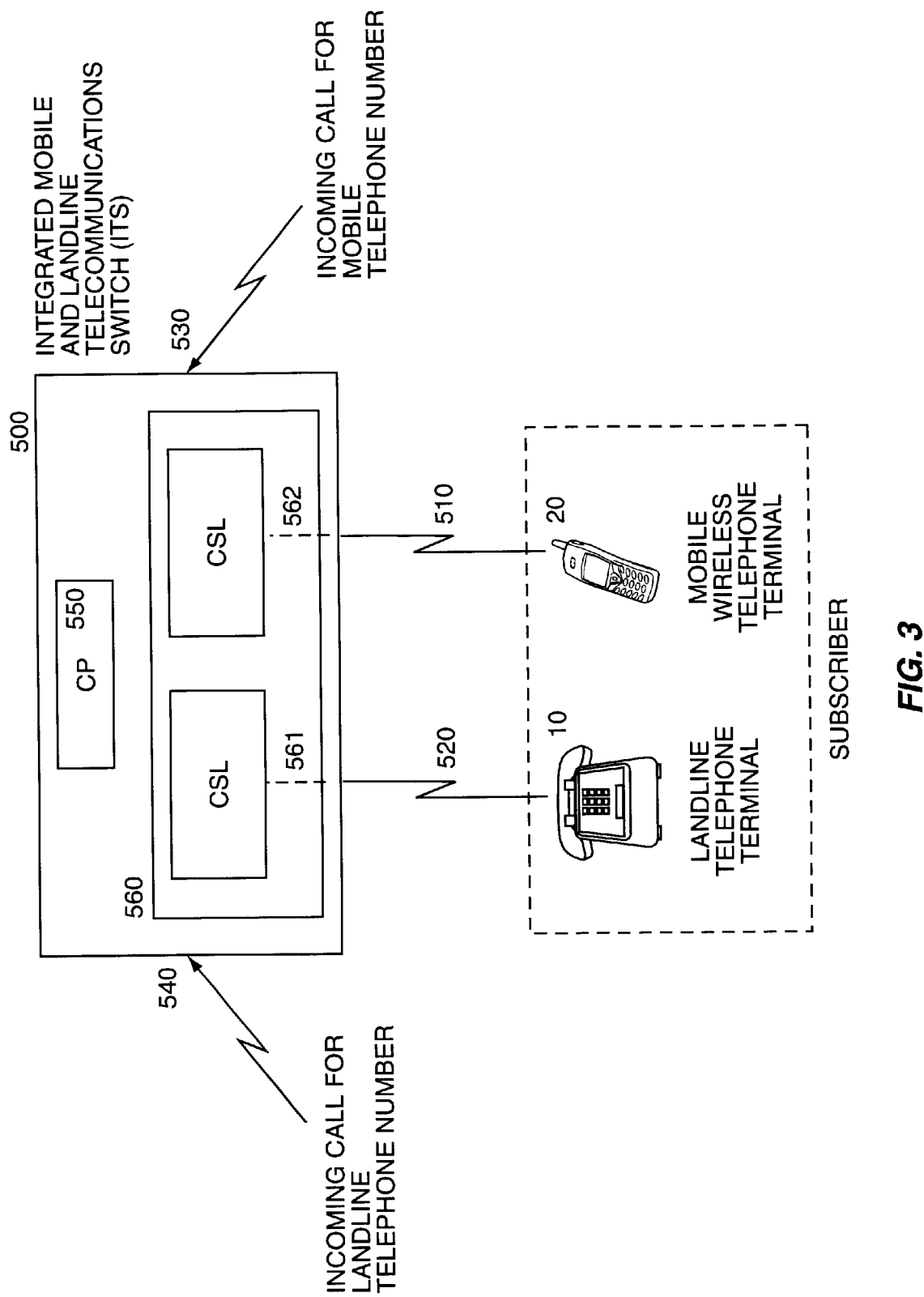
FIG. 3 is a block diagram illustrating another embodiment of the present invention, which includes an integrated mobile, and landline telecommunications switch.

Recent technological advances have provided a single integrated telecommunications switch for servicing both mobile wireless and landline telephone terminals. The method and apparatus of the present invention may be advantageously implemented by using a single integrated mobile and landline telecommunications switch (ITS) 500. See FIG. 3 for details regarding the integrated mobile and landline telecommunications switch. The integrated telecommunications switch provides an interface for mobile wireless telephone terminals denoted as 510. In addition, the integrated telecommunication switch provides an interface 520 for landline telephone terminals. Further., the integrated telecommunications switch provides interfaces for receiving incoming telephone calls for mobile wireless and landline telephone terminals. The interface for receiving telephone calls for a landline telephone terminal is denoted as 540. The interface for receiving telephone calls for a mobile wireless telephone terminals is denoted as 530 accordingly within FIG. 3. Although two separate interfaces are shown, those skilled in the art will appreciate that one interface can serve to receive incoming telephone calls for both landline and mobile wireless telephone terminals.

An integrated telecommunications switch can serve as the requesting apparatus 300, the serving apparatus 400, or both in all discussions of the present invention. Therefore, the integrated telecommunications switch includes a computer processor 550 executing software, and at least one memory device 560 for storing one or more call screen lists. In addition, an integrated telecommunications switch can inter-operate with both landline and mobile telecommunications switches for carrying out the present invention, if so desired. A single integrated telecommunications switch can comprise a standalone system for carrying out the present invention.

In any event, it is advantageous for one integrated telecommunications switch to serve as the requesting apparatus 300 and the serving apparatus 400. Performance advantages are available when the requesting and serving apparatuses are implemented within one switch since all processing of incoming calls is carried out locally within the same switch. Further, twinned call screen lists or a single combined call screen list may be efficiently implemented in an integrated telecommunications switch with the various memory device options described herein.

Call Screen List Storage Options

The method and apparatus of the present invention operate regardless of whether a landline or mobile wireless telephone terminal of a subscriber receives an incoming telephone call. A memory device 410 is used in all cases to store a call screen list associated with a mobile telephone terminal or a landline telephone terminal. The memory device 410 may be disposed in the serving apparatus 400 connected through a local electrical or fiber bus, in an external device 420 located remotely but operably connected through a communications link, or within both. Further, a memory device can be disposed in the requesting apparatus 300, in an integrated mobile and landline telecommunications switch 500, or in combinations of the above mentioned switches and apparatuses. However, there are differences in implementation depending on whether a landline or mobile wireless telephone terminal is called.

Figure 4:
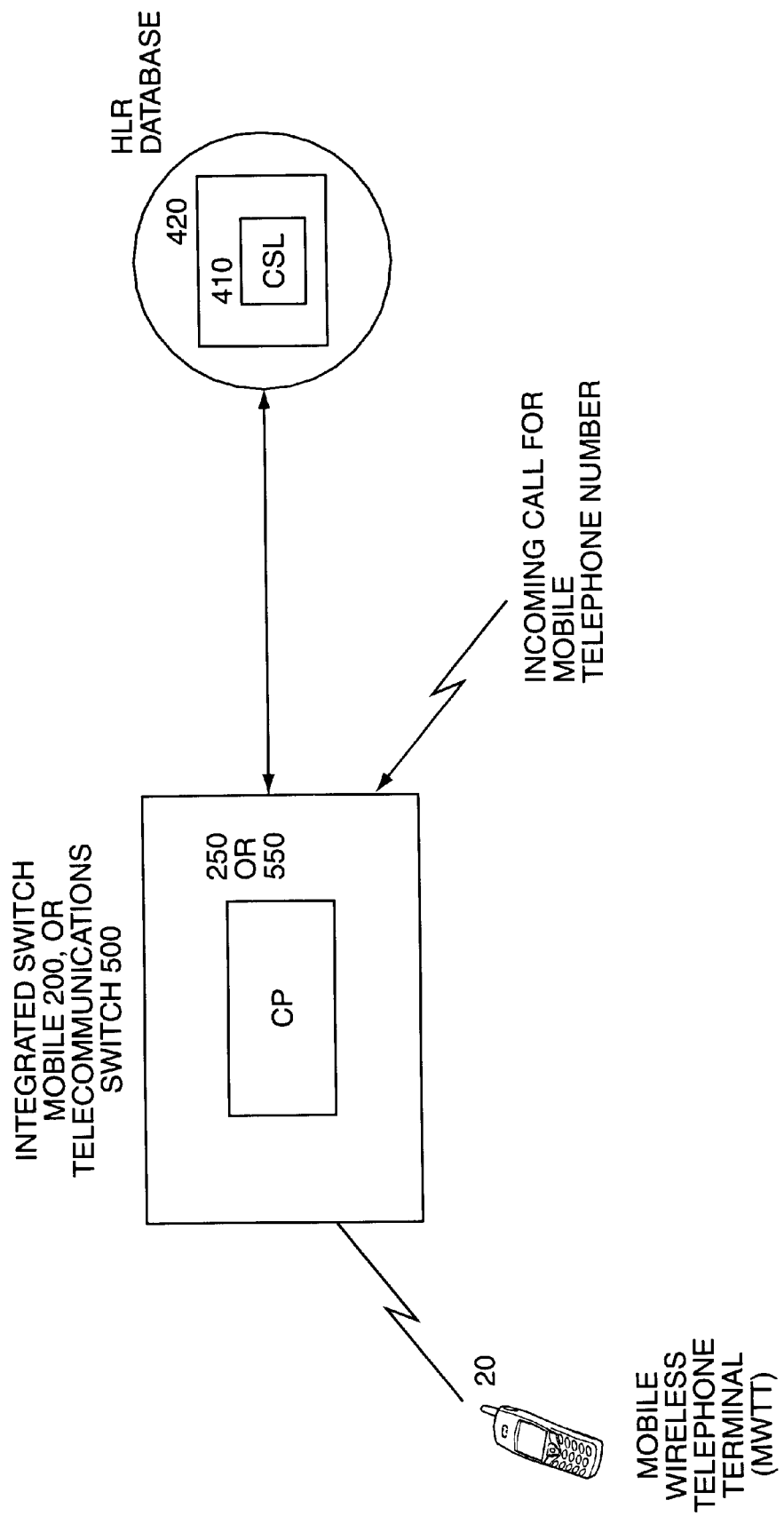
FIG. 4 is a block diagram illustrating the Home Location Register database for supporting mobile wireless telephone terminals, according to one embodiment of the present invention.

FIG. 4 illustrates the embodiment in which an incoming telephone call is intended for a mobile wireless telephone terminal. A mobile telecommunications switch 200 or integrated telecommunications switch 500 would be required to support a mobile wireless telephone terminal 20 in this case. A telecommunications switch supporting a mobile telephone terminal stores a call screen list associated with the mobile telephone terminal as part of an HLR (Home Location Register) database. The HLR database may be disposed within a memory device 410 disposed within the mobile telecommunications switch 200 or the integrated telecommunications switch 500. Alternatively, the HLR database may be disposed within an external device 420, such as computer server device, acting as a database server to the telecommunications switch servicing the mobile telephone terminal. A computer processor 550 executing software is used to access, analyze, and process at least one CSL stored within the memory device.

When a call is received for a mobile wireless telephone terminal, the call is processed by call screen list based services after each call screen list associated with the telephone terminal of the subscriber, including the list stored in the HLR, is accessed and analyzed. In this situation, the requesting apparatus is the mobile telecommunications switch 200 or the integrated telecommunications switch 500. The server apparatus comprising the remainder of the system could be a landline telecommunications switch 100 or an integrated telecommunications switch 500. Optionally, the landline telephone terminal of the subscriber could be serviced by the server apparatus.

Figure 5:
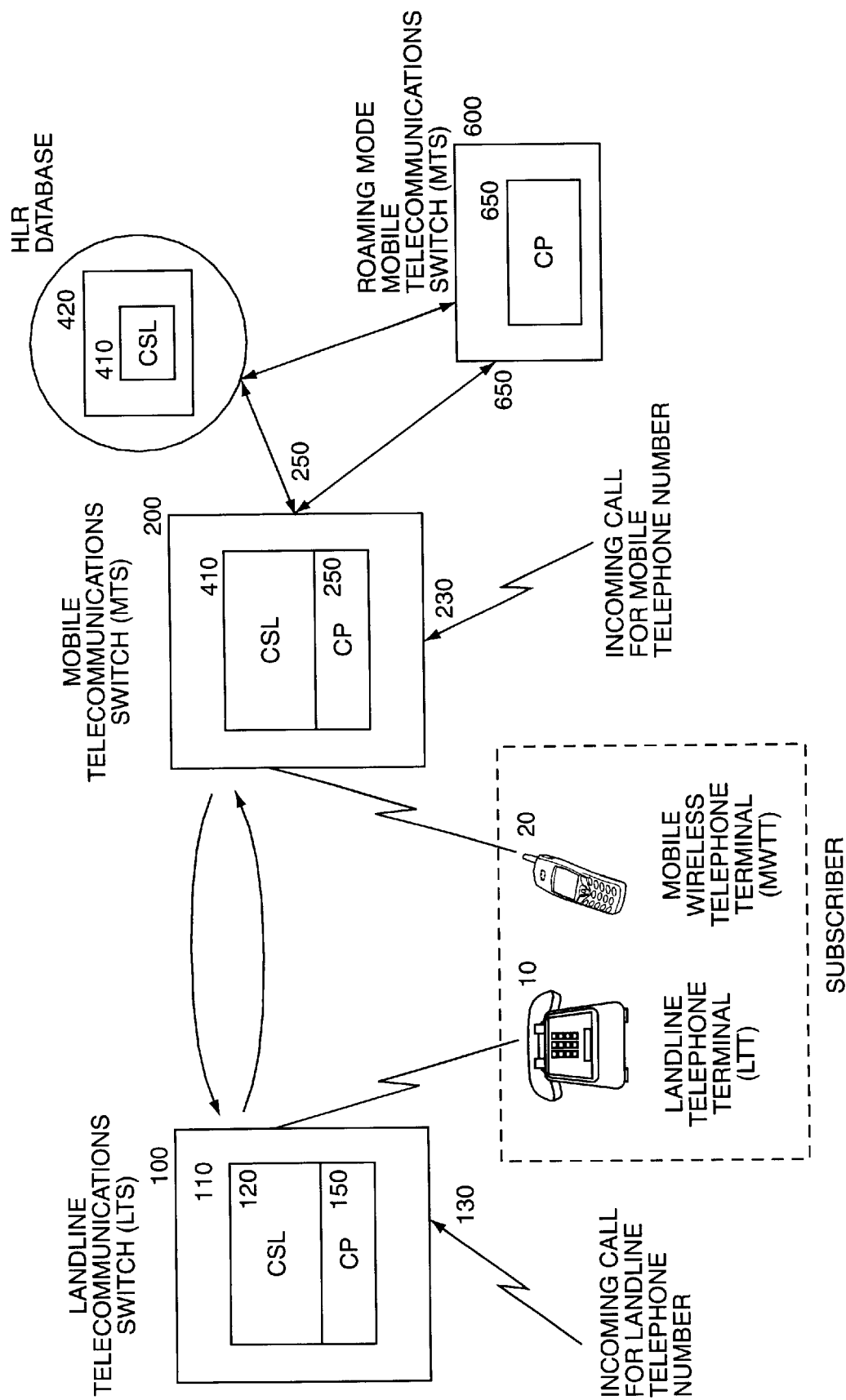
FIG. 5 is a block diagram illustrating a system for providing integrated call screen list based telephony services, according to one embodiment of the present invention.

However, when a call is received for a landline telephone terminal, the corresponding landline or integrated telecommunications switch stores the associated call screen list without requiring an HLR database. For instance, FIG. 5 shows an incoming call for a landline telephone terminal 10. The landline telecommunications switch 100 shown connected to the landline telephone terminal could be substituted by an integrated telecommunications switch 500 for carrying out the present invention. In either case., the memory device storing the call screen list is preferably disposed within the corresponding telecommunications switch. For instance, FIG. 5 illustrates a memory device 110 disposed within landline telecommunications switch 100. As shown, in either case, no HLR database is required for a landline telephone terminal.

Another possibility exists for storing call screen lists for both mobile wireless and landline telephone terminals within the Intelligent Network (IN) environment. A network node within the Intelligent Network or Advanced Intelligent Network (AIN) can operate as an external call screen list server. Examples include an SCP (Service Control Point) device or an ISCP (Intelligent Service Control Point) device. These devices operate within the present invention by storing call screen lists associated with landline, mobile wireless, or both types of telephone terminals. These devices can be operably connected to a landline, mobile, or integrated telecommunications switch receiving an incoming telephone call for a landline or mobile wireless telephone terminal. Those skilled in the art will appreciate that packet based devices on the Internet and cell based devices in an ATM (Asynchronous Transfer Mode) network can also serve as external call screen list servers.

The Integrated Call Screen List Services System

The present invention provides a system and method for selectively providing integrated call screen list based services for a subscriber having landline and mobile wireless telephone terminals, as shown in FIG. 5. The system diagram in FIG. 5 assumes that an incoming call is intended for the mobile wireless telephone terminal of the subscriber. However, those skilled in the art will understand that the system is symmetrical and that the incoming call could be intended for the landline telephone terminal as well. Functions within the system can be provided equally by landline, mobile, and integrated telecommunications switches, as well as other properly configured telephony service devices. As such, call screen list based services can be provided to either a landline or mobile wireless telephone terminal of a subscriber having both types of telephone terminals.

The system comprises a first telecommunications switch for servicing mobile wireless telephone terminal 20 by receiving calls intended therefore. In this example, the first telecommunications switch is illustrated as a mobile telecommunications switch 200. However, according to the discussion above, the first telecommunications switch here may comprise an integrated telecommunications switch 500, or a landline telecommunications switch 100 if a call had been directed to a landline telephone terminal. Further, the present invention operates equally when the first telephone terminal is a mobile telephone terminal roaming outside its home service area.

Once the incoming call is received by the MTS switch 200, the call screen list corresponding to the mobile wireless telephone being called is accessed. A computer processor 250 is shown within the MTS switch, which executes software to access, analyze, and process at least one CSL stored within the memory device. The access can occur whether the call screen list is stored within the MTS switch 200, in memory device 410, within an external device 420, or within any combination thereof. The memory device storing the call screen list is operably connected to a telephony service device which provides call screen list based services and to at least one computer processor. In this example, the telephony service device is represented by the landline telecommunications (LTS) switch 100. As mentioned above, the operable connection could comprise a local electrical or fiber bus, or a communications link to a remote device. Here, the MTS switch 200 will first determine whether the mobile wireless telephone terminal 20 is subscribed to call screen list based services, and whether that telephone terminal is associated with another telephone terminal of the subscriber. The descriptions above regarding the features and operation of the requesting apparatus and various call screen list implementations apply equally to the MTS switch 200 shown in this example of the system.

If thus subscribed, the first telecommunications switch represented by the MTS switch 200 can communicate with the telephony service device represented by example as LTS switch 100. In this example, the telephone terminal of the subscriber not intended to receive the incoming telephone call is landline telephone terminal 10, which is serviced by LTS switch 100. Per previous discussion, an integrated telecommunications switch 500 switch or another properly configured device could also serve as the telephony service device. MTS switch 200 can communicate with the telephony service device associated with the landline telephone terminal to analyze at least one call screen list associated with the landline telephone terminal. The telephony service device, denoted as the LTS switch 100 in the example in FIG. 5, analyzes each call screen list associated with the landline telephone terminal of the subscriber. Computer processor 150 executing software is used to access, analyze, and process a call screen list stored within the memory device. The call screen list is preferably stored locally in a memory device within the LTS switch assigned to the landline telephone terminal. However, as discussed previously, there are various configurations for the memory device. Based on the results of the analysis of call screen lists associated with the mobile wireless and landline telephone terminals, call screen list based services are provided to the first telephone terminal of the subscriber being called (i.e., mobile wireless telephone terminal 10) according to the terms defined within each of the call screen lists.

If the telephone terminal receiving a telephone call is a mobile wireless terminal, the system provided by the present invention provides call screen list based services whether the terminal is in its home service area or roaming beyond the home service area. In the roaming case, the telephone call intended for the first terminal is ultimately serviced by the roaming mode MTS switch 600, as shown in FIG. 5. MTS switch 600 communicates with the home MTS switch 200 and the HLR database to carry out the present invention. When the first telephone terminal is roaming, the home MTS switch receiving the incoming call functions in the same manner described previously. Messages transferred between home MTS switch 200 or the HLR database and the roaming mode MTS switch 600 allow integrated call screen list based services to be provided to a roaming mobile wireless telephone terminal. After integrated call screen list based services are applied to the incoming telephone call, the home MTS locates the roaming mode MTS servicing the roaming mobile wireless telephone terminal. The call is relayed and delivered to the roaming mode MTS, or it is given treatment or terminated.

The roaming mode mobile telecommunications switch 600 is shown as another MTS switch operably connected to MTS switch 200, although it could also be an integrated telecommunications switch 500 or other telephony devices as discussed. For purposes of this example, the MTS switch 200 will access the HLR database within an external memory device 420 operably connected to MTS switch 200 and the roaming mode MTS switch 600. According to an earlier discussion, there are various configurations of memory devices and HLR databases operable within the present invention. The call screen list associated with mobile wireless telephone terminal 20 being called is stored within the HLR database.

As mentioned, the present invention requires messages between the roaming mode MTS switch and either the first telecommunications switch (MTS switch 200) or the HLR database to serve a roaming mobile wireless telephone terminal. A messaging interface 250 is provided by the MTS switch 200 for communicating with the roaming mode MTS switch 600 and the HLR database. Accordingly, roaming mode MTS switch 600 and the HLR database are provided with complimentary messaging interfaces. The roaming mode MTS switch 600 can communicate with MTS switch 200 to access the HLR database which contains at least one call screen list associated with the mobile wireless telephone terminal 20 being called. Alternatively, MTS switch 200 can communicate directly with the HLR database as shown in FIG. 5. Once the communication occurs, the present invention operates as described previously for a mobile wireless telephone within the home service area. Messages serve to link the roaming mode MTS switch 600 to the home MTS switch 200. As noted, messages allow the roaming mobile wireless telephone terminal to be located, and to have the call terminated or delivered to the roaming mode MTFS switch 600. The discussion of the method according to the present invention in FIG. 6 further details roaming mode messaging between the HLR in the home MTS switch and the roaming MTS switch.

The system provided by the present invention includes a user interface for managing integrated call screen list based services, similar to the user interface discussed above. Further, the same varieties of call screen list based services are available as were discussed before. Moreover, in terms of the operation of the present invention, the system can be viewed analogously as a combination of the requesting apparatus and serving apparatus discussed above.

The Integrated Services Method

Figure 6:
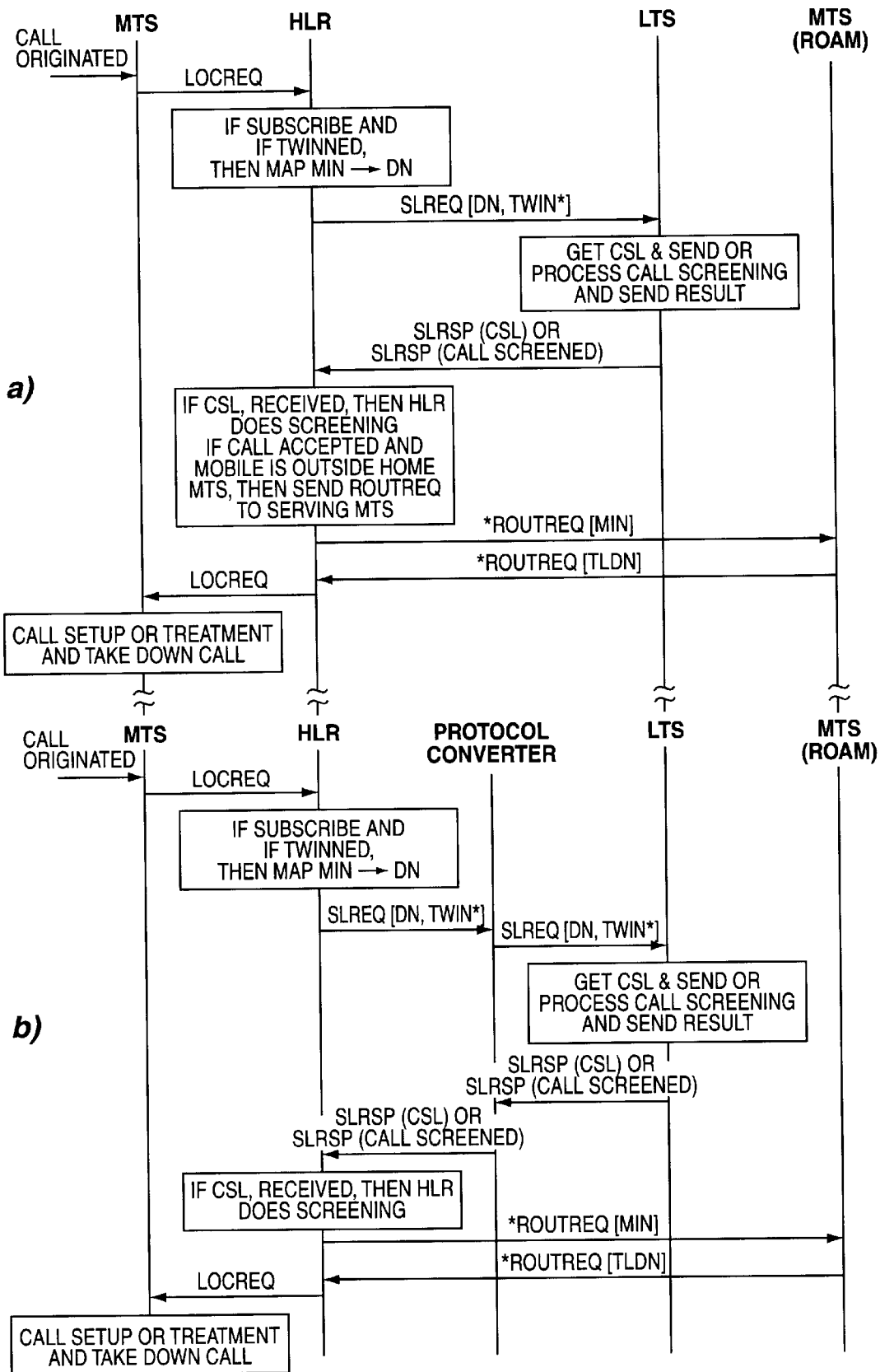
FIG. 6 is a diagram illustrating a messaging and processing method for providing integrated call screen list based telephony services, according to one embodiment of the present invention.

The present invention likewise provides a method for selectively integrating call screen list based service for a subscriber having both landline and mobile wireless telephone terminals. As discussed, an important aspect of the present invention is the coordination between call screen list based services provided to both landline and mobile wireless telephone terminals of a subscriber. A single call screen list may be used to coordinate the delivery of these services, or multiple call screen lists may be coordinated as described above. By way of example, the method will be illustrated in FIG. 6, as applied to the system shown in FIG. 5. FIG. 6*a*) contains an example of the method provided by the present invention, showing an incoming call received for a mobile wireless telephone terminal located in any service area. FIG. 6*b*) illustrates the method when an optional protocol converter provides an interface between an HLR and an LTS switch operating with different protocols. Those skilled in the art will appreciate that the method according to the present invention can be carried out by the requesting apparatus, first telecommunications switch, serving apparatus, or telephony service device as discussed earlier in the detailed description of the present invention. Further, the method according to the present invention can be carried out within a traditional circuit switched network environment, or alternatively within networks that also comprise packet based or cell based telephony devices.

The method provided by the present invention initially receives a telephone call intended for either a landline telephone terminal or a mobile wireless telephone terminal of a subscriber. This step is illustrated as the incoming telephone call being received into the mobile telecommunications switch 200 in FIG. 5. FIGS. 6*a*) and 6*b*) show the incoming telephone call originated into the home mobile telecommunications switch MTS. Note that the messages shown in FIGS. 6*a*) and 6*b*) could be in various protocols and messaging formats, including but not limited to TCAP (Tele Communications Access Protocol) messages, IS41 messages, packet based messages, or cell based messages. Those skilled in the art will also understand that the present invention operates as well if the incoming telephone call was intended for a landline telephone terminal of the subscriber supported by a corresponding landline or integrated telecommunications switch.

The method next analyzes each call screen list associated with the mobile and landline telephone terminals of the subscriber, including the call screen list associated with the telephone terminal being called, irrespective of which telephone terminal was actually being called. The analysis preferably occurs through messaging and processing operations between the telecommunications switch servicing the telephone terminal being called, and the telecommunications switch servicing the telephone terminal of the subscriber not being called. However, another telecommunications switch or telephony device can analyze a call screen list. In any case, computer processors disposed within each telecommunications switch or telephony device executing software carry out the processing and messaging operations. This step is shown in FIG. 5 by the bidirectional arrows between the landline telecommunications switch 100 and the mobile telecommunications switch 200. Further, these operations are illustrated by the series of arrows between the landline telecommunications switch LTS, the mobile telecommunications switch MTS, and the Home Location Register HLR as illustrated in FIG. 6*a*).

Finally, the method provides call screen list based telephony services to the first telephone terminal for which an incoming call was received. These services are provided according to the analysis of each call screen list associated with the mobile wireless and landline telephone terminals of a subscriber. The call is ultimately setup, forwarded, or terminated after being screened according to one or more call screen lists associated with both mobile wireless and landline telephone terminals. According to the preceding description of the invention, the method may be carried out irrespective of the number, organization, and allocation of call screen lists assigned to landline and mobile wireless telephone terminals of a subscriber.

Upon receiving a telephone call, the method further comprises the step of determining to which call screen list based services the telephone terminal receiving an incoming telephone call is subscribed. This occurs before any call screen list based services are provided to the telephone terminal of the subscriber being called. This step is illustrated by the transmission of a LOCREQ message from the mobile telecommunications switch MTS to the Home Location Register HLR in FIG. 6a). In addition, the HLR is shown testing whether the telephone terminal is subscribed to any call screen list based services. Further, the HLR can determine to which call screen list based services the first telephone terminal being called is subscribed.

Prior to analyzing each call screen list, the method determines whether the first telephone terminal receiving the incoming telephone call is either logically twinned or logically associated with another telephone terminal of the subscriber not intended to receive the incoming call. For example, if a mobile telephone terminal of a subscriber is receiving an incoming telephone call, the method and apparatus of the present invention determines whether the mobile telephone terminal is logically associated with a landline telephone terminal of the subscriber. Logical twinning affects how call screen list based services are provided for the telephone terminal of the subscriber receiving an incoming telephone call. Logical twinning will provide call screen list based services according to the call screen list of the first telephone terminal being called, of a telephone terminal not being called, or of either/both telephone terminals depending on the particular situation. Logical twinning in essence defines which call screen list is utilized under a given set of circumstances.

Alternatively, the method provided by the present invention comprises the step of logically associating the first telephone terminal being called with another telephone terminal of the subscriber other than the one being called. Logical association determines how to provide call screen list based services according to call screen lists associated with both mobile wireless and landline telephone terminals. This step logically associates the landline and mobile wireless telephone terminals of a subscriber, irrespective of which telephone terminal of the subscriber was receiving the incoming telephone call. In one embodiment, this step can comprise using one call screen list associated with both landline or mobile wireless telephone terminals for processing incoming telephone calls for both types of telephone terminals. In another embodiment, this step can comprise messaging and coordination between two or more call screen lists associated with the landline and mobile wireless telephone terminals of a subscriber.

The method according to the present invention includes another embodiment further comprising the step of mapping a first identification number associated with the first telephone terminal being called to another parameter. Preferably, the first identification number is a telephone number associated with the first telephone terminal being called. The second parameter could be a second identification number associated with the telephone terminal of the subscriber not intended to receive the incoming call. Preferably, the second identification number is a telephone number associated with a telephone terminal of the subscriber not being called. Alternatively, the first and second identification numbers could be some other parameter that facilitates linking the call screen lists associated with the landline and mobile telephone terminals of a subscriber. Remapping facilitates the analysis performed before call screen list based services are provided.

Those skilled in the art recognize that other terminology may be used to describe telephone numbers. For a landline telephone terminal, the telephone number is also referred to as a Directory Number (DN). For a mobile telephone terminal, the telephone number is also referred to as a Mobile Identification Number (MIN). For the example shown in FIG. 6a), the Mobile Identification Number MIN associated with the mobile wireless telephone terminal being called is mapped to a Directory Number DN associated with the landline telephone terminal of the subscriber. Those skilled in the art further understand that the mapping could occur in the opposite sense, that is, from a landline telephone terminal being called to a mobile wireless telephone terminal of the subscriber.

Another embodiment of the method according to the present invention further includes the step of sending a request to the telecommunications device servicing the telephone terminal of the subscriber not receiving the incoming call. In effect, this step implements checking whether call screen list based services can be provided to the first terminal according to the services to which the telephone terminal not being called is subscribed. For instance, when the mobile wireless telephone terminal of a subscriber receives an incoming call, the landline telecommunications switch servicing the landline telephone terminal not being called is checked to see whether it can and will provide call screen list based services to the mobile telephone terminal being called. Further, in FIG. 6, this step is represented by the SLREQ request sent from the Home Location Register HLR to the Landline Telecommunications Switch LTS. The SLREQ message is a new message type provided by the present invention which functions as a call screen list request message. This message can be implemented in IS41, TCAP, or numerous other protocols. An SLREQ request message contains a Directory Number DN parameter, or another parameter to which the telephone number of the mobile wireless telephone terminal being called has been mapped. Optionally, the SLREQ message can contain information regarding the TWINNED status of the telephone terminals. The asterisk (*) indicates that the TWINNED parameter is an optional component in an SLREQ request message. This is shown as well in FIG. 6a).

The method according to the present invention includes another embodiment further defining the providing step as comprising two additional steps. First, the method provides the step of messaging with a telephony service device supporting a second telephone terminal of the subscriber not being called. The transmitted messages are used to determine whether call screen list based services for the first telephone terminal being called can be provided according to the call screen list based services to which the second telephone terminal is subscribed. Next, the method further includes the step of processing the incoming telephone call received by the first telephone terminal of a subscriber according to input data. Input data can be a call screen list associated with the first telephone terminal, a call screen list associated with the second telephone terminal, or at least one call screen list associated with both the first and second telephone terminals of a subscriber. Services are provided to the first telephone terminal being called according to the results of the analysis. Call screen list based services can thus be provided according to the services to which the first telephone terminal is subscribed, the second telephone terminal is subscribed, or both telephone terminals are subscribed. For instance, in the example illustrated in FIGS. 5 and 6, call screen list based services are provided to the mobile wireless telephone terminal being called after analyzing the services provided to both the mobile wireless telephone terminal and the landline telephone terminal of the subscriber.

Returning to FIG. 6a), once the SLREQ request message is received by the Landline Telecommunications Switch LTS, the LTS can access a call screen list CSL stored therein for the telephone terminal of the subscriber not intended to receive the incoming telephone call. At this point, processing can proceed in two different ways. The call screen list from the LTS can be sent back to the HLR database to be analyzed before the HLR decides whether and how to apply call screen list based services to the incoming telephone call. For example, the HLR could logically combine the telephone numbers to be blocked from both a local MTS call screen list and the LTS call screen list. Optionally, the LTS can process and screen the incoming call therein and apply call screen list based services to the incoming telephone call. Then the LTS can send only the result of processing or screening the incoming call back to the MTS switch. For instance, if the incoming call should be blocked according to the LTS call screen list, the LTS could instruct the MTS switch to merely reject or terminate the incoming call. These alternative processes are illustrated in FIG. 6a).

In either alternative, a message is sent from the LTS switch to the HLR database. The message can contain either the call screen list stored in the LTS switch, or the results of processing or screening the incoming call. For example, FIG. 6a) shows an SLRSP message being sent back to the HLR database in either alternative. The SLRSP message is a new message type provided by the present invention which functions as a screen list response message. This message can be implemented in IS41, TCAP, or numerous other protocols. Once the SLRSP message is received at the HLR, two alternative processes can occur. If the call screen list is received from the LTS switch, the HLR can process or screen the call after considering one or more call screen lists from the HLR and LTS switch. If the result of call screening or processing is received by the HLR, the call can be setup or terminated without further processing by the HLR. In either case, a message is ultimately sent to the MTS switch to setup, forward, or terminate the incoming call, according to the call screen list based services applied to the incoming telephone call. The MTS switch will take the appropriate action with respect to the first telephone terminal being called. In FIG. 6a), the LOCREQ message sent from the HLR database to the MTS switch informs the MTS switch whether to setup the call or terminate the call for the first telephone terminal being called. For this example, the final disposition of the incoming call after it was processed and screened by at least one call screen list is performed at the MTS switch. Recall that in this example, the MTS switch is the device that originally received the incoming telephone call intended for the first telephone terminal served by the MTS switch.

As shown in FIGS. 6a) and 6b), the method may also be carried out when an incoming telephone call is received for a mobile wireless telephone terminal located outside of its home service area. In this situation, messaging occurs between the Mobile Telecommunications Switch, MTS (Roam), serving the mobile wireless telephone terminal roaming outside of its home service area and the MTS Switch serving the home service area. As shown in FIG. 6a), a ROUTREQ message is sent from the Home Location Register HLR to the MTS (Roam) switch. An asterisk (*) shows that the ROUTREQ message is used only when the first telephone terminal being called is a mobile wireless telephone terminal roaming outside its home service area. A parameter denoted as the MIN (Mobile Identification Number) is also sent to the MTS (Roam) switch. As discussed, MIN is essentially the telephone number of the mobile wireless telephone terminal. In return, the MTS (Roam) switch sends a ROUTREQ message back to the HLR, with a TLDN parameter. The TLDN parameter is a temporary Directory Number used for call setup and delivery to a roaming mobile wireless telephone terminal.

The ROUTREQ message is used after the incoming call has been processed or screened according to at least one integrated call screen list. At this point, a ROUTREQ message is used to locate the roaming mobile wireless telephone terminal. Further, the subscriber user interface discussed previously operates equally for a roaming mobile wireless telephone terminal by using existing messaging protocols that support roaming.

FIG. 6b) illustrates the present invention operating within a network using different messaging protocols. For instance, the HLR database may interface with IS41 messages, while the LTS switch may only interface with TCAP messages. In this case, a protocol converter may be used to translate different messaging protocols. For example, the IS41 message originating from the HLR database is received by the protocol converter. The converter translates the IS41 message into a TCAP message for the LTS switch. The protocol converter functions similarly when TCAP messages from the LTS switch are to be sent back to the HLR database that receives 1S41 messages.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that modifications and other embodiments are intended to be included within the scope of the appended claims which define the present invention.

What is claimed is:

1. A method for selectively integrating call screen list based services for a subscriber having both mobile and landline telephony service, comprising the steps of:

receiving a telephone call intended for a first telephone terminal of the subscriber selected from the group consisting of a mobile telephone terminal and a landline telephone terminal;

analyzing each call screen list associated with the mobile and landline telephone terminals of the subscriber, irrespective of the telephone terminal of the subscriber for which the telephone call received was intended; and providing telephony services to the first telephone terminal based upon the analysis of said each call screen list associated with the mobile and landline telephone terminals of the subscriber.

2. The method according to claim 1, further comprising the step of determining, prior to said providing step, whether said first telephone terminal of the subscriber is subscribed to receive call screen list based services.

3. The method according to claim 1, wherein said analyzing step further comprises the step of determining the call screen list based services to be provided to said first telephone terminal of the subscriber.

4. The method according to claim 1, further comprising the step of logically associating each call screen list associated with said mobile telephone terminal and said landline telephone terminal of the subscriber, irrespective of the telephone terminal for which the telephone call received was intended, prior to said providing step.

5. The method according to claim 1, further comprising the step of logically twinning each call screen list associated with said mobile telephone terminal and said landline telephone terminal of the subscriber, irrespective of the telephone terminal for which the telephone call received was intended, prior to said providing step.

6. The method according to claim 1, wherein said first telephone terminal of the subscriber is associated with a first identification number, wherein a second telephone terminal of the subscriber not intended to receive the telephone call is also selected from the group consisting of a landline telephone terminal and a mobile telephone terminal, wherein said second telephone terminal is associated with a second identification number, and wherein the method further comprises the step of remapping said first identification number to said second identification number to link each call screen list associated with the mobile and landline telephone terminals of the subscriber.

7. The method according to claim 1, wherein a second telephone terminal not intended to receive the telephone call is also selected from the group consisting of a mobile telephone terminal and a landline telephone terminal, and wherein said analyzing step further comprises the step of determining whether said first telephone terminal of the subscriber receiving a telephone call is twinned logically with said second telephone terminal of the subscriber.

8. The method according to claim 1, wherein a second telephone terminal of the subscriber not intended to receive the telephone call is also selected from the group consisting of a mobile telephone terminal and a landline telephone terminal, and wherein said analyzing step further comprises the step of determining whether call screen list based services can be provided to said first telephone terminal according to the call screen list based services to which said second telephone terminal is subscribed.

9. The method according to claim 1, wherein a second telephone terminal of the subscriber not intended to receive the telephone call is also selected from the group consisting of a mobile telephone terminal and a landline telephone terminal, wherein said second terminal receives telephony services from a telephony service device, and wherein said providing step comprises the steps of:

messaging with said telephony service device to determine whether call screen list based services are to be provided for said first telephone terminal according to the call screen list based services to which said second telephone terminal is subscribed; and processing the telephone call received by said first telephone terminal according to input data selected from the group consisting of a call screen list associated with said first telephone terminal, a call screen list associated with said second telephone terminal, and at least one call screen list associated with both said first and said second telephone terminals.

10. The method according to claim 1, wherein said providing step comprises the step of processing the telephone call received for said first telephone terminal according to the resulting call screen list based services to be provided to said first telephone terminal as determined in said analyzing step.

11. A system for selectively integrating call screen list based services for a subscriber having both mobile and landline telephony service, comprising:

a first telecommunications switch for receiving a telephone call intended for a first telephone terminal of a subscriber selected from the group consisting of a mobile telephone terminal and a landline telephone terminal;

a memory device for storing each call screen list associated with telephony services provided to the mobile and landline telephone terminals of the subscriber; and a telephony service device, operably connected to said first telecommunications switch and said memory device, for analyzing each call screen list and providing telephony services to said first telephone terminal according to the analysis of said each call screen list associated with the mobile and landline telephone terminals of the subscriber.

12. The system according to claim 11, wherein said first telecommunications switch and said telephony service device are disposed within a single integrated telecommunications switch for receiving calls and providing telephony services to both mobile and landline telephone terminals.

13. The system according to claim 11, wherein said memory device stores a single integrated call screen list associated with both mobile and landline telephone terminals of a subscriber, and wherein call screen list based services are provided to said first telephone terminal intended to receive the telephone call according to the analysis of said single integrated call screen list.

14. The system according to claim 11, wherein said memory device is disposed within at least one of said first telecommunications switch and said telephony service device.

15. The system according to claim 11, further comprising a server device disposed external to said first telecommunications switch and said telephony service device, wherein said memory device is disposed within said server device and operably connected through a communications link to at least one of said first telecommunications switch and said telephony service device.

16. The system according to claim 11, wherein a second telephone terminal not intended to receive the telephone call is also selected from the group consisting of a mobile telephone terminal and a landline telephone terminal, wherein said telephony service device comprises a second telecommunications switch for providing telephony services to said second telephone terminal, said second telecommunications switch further adapted to receive a request from said first telephone terminal to provide call screen list based services thereto.

17. The system according to claim 16, wherein said first telecommunications switch stores a first call screen list for said first telephone terminal receiving the telephone call, wherein said second telecommunications switch stores a second call screen list for said second telephone terminal not intended to receive the telephone call, and wherein messages are transferred between said first and said second telecommunications switches regarding said first and said second call screen lists prior to providing telephony services to said first telephone terminal.

18. The system according to claim 16, wherein said first telecommunications switch stores a first call screen list for said first telephone terminal receiving a telephone call, wherein said second telecommunications switch stores a second call screen list for said second telephone terminal not intended to receive the telephone call, and wherein said first and said second call screen lists are logically twinned together to determine the call screen list based services to be provided to said first telephone terminal.

19. The system according to claim 11, further comprising a roaming mode telecommunications switch operably connected to said first telecommunications switch, for servicing a mobile telephone terminal of the subscriber operating outside a local home service area, wherein said first telecommunications switch comprises a home mode telecommunications switch for servicing a mobile telephone terminal of the subscriber operating within the local home service area, and wherein said home mode and said remote mode telecommunications switches cooperate to provide integrated call screen list based telephony services to the mobile telephone terminal of the subscriber receiving a telephone call irrespective of whether the mobile telephone terminal is operating within or outside the local home service area.

20. The system according to claim 11, wherein call screen list based services defined by a call screen list stored by said memory device comprise at least one service selected from the group consisting of call screen acceptance, call screen rejection, call screen selective call forwarding, call screen selective voicemail forwarding, home/roam call screen services, and conditional call screening services.

21. The system according to claim 11, wherein at least one of said first telecommunications switch and said telephony service device further comprises a subscriber user interface for configuring said each call screen list associated with the mobile and landline telephone terminals of a subscriber and the call screen list based services defined by said each call screen list.

22. An apparatus for selectively providing integrated call screen list based telephony services for a subscriber having both mobile and landline telephony service, comprising:

a first interface for receiving requests to provide call screen list based telephony services to a first telephone terminal of a subscriber receiving a telephone call, said first telephone terminal selected from the group consisting of a mobile telephone terminal and a landline telephone terminal; and a memory device, operably connected to said first interface, for storing each call screen list associated with telephony services provided to the mobile and landline telephone terminals of the subscriber; and a computer processor, operably connected to said memory device, for accessing and analyzing each call screen list stored within said memory device;

wherein call screen list based telephony services are provided to said first telephone terminal according to analysis of said each call screen list, irrespective of the telephone terminal of the subscriber for which the telephone call received was intended.

23. The apparatus according to claim 22, wherein a second telephone terminal of the subscriber not intended to receive the telephone call is also selected from the group consisting of a mobile telephone terminal and a landline telephone terminal, and further comprising a second interface for providing telephony services to said second telephone terminal.

24. The apparatus according to claim 22, wherein said memory device stores each call screen list comprising a single call screen list associated with call screen list based services provided to both mobile and landline telephone terminals of the subscriber.

25. The apparatus according to claim 22, wherein said memory device stores each call screen list comprising at least two call screen lists associated respectively with call screen list based services provided to mobile and landline telephone terminals of the subscriber.

26. The apparatus according to claim 25, wherein said first interface transmits messages regarding call screen list based services defined by said each call screen list, prior to providing call screen list based telephony services to said first telephone terminal receiving a telephone call.

27. The apparatus according to claim 25, wherein a second telephone terminal of the subscriber not intended to receive the telephone call is also selected from the group consisting of a mobile telephone terminal and a landline telephone terminal, wherein at least one call screen list defines call screen list based services provided to said first telephone terminal and at least one call screen list defines call screen list based services provided to said second telephone terminal, and wherein call screen lists corresponding to said first and said second telephone terminals are associated logically prior to providing call screen list based services to said first telephone terminal.

28. The apparatus according to claim 22, wherein call screen list based services defined by a call screen list stored by said memory device comprise at least one service from the group consisting of call screen acceptance, call screen rejection, call screen selective call forwarding, call screen selective voicemail forwarding, home/roam call screen services, and conditional call screening services.

29. The apparatus according to claim 22, wherein said memory device is operably connected by a connection selected from the group consisting of a local bus connection and a remote connection through a communications link.

30. The apparatus according to claim 22, further comprising a subscriber user interface for configuring said each call screen list associated with the mobile and landline telephone terminals of a subscriber and the call screen list based services defined by said each call screen list.

31. An apparatus for selectively requesting integrated call screen list based telephony services for a subscriber having both mobile and landline telephony service subscribers, comprising:

a first interface for receiving a telephone call intended for a first telephone terminal of a subscriber selected from the group consisting of a mobile telephone terminal and a landline telephone terminal;

a second interface for sending requests for call screen list based telephony services to be provided for said first telephone terminal intended to receive the telephone call;

a memory device operably connected to said first interface and said second interface, for storing each call screen list associated with telephony services provided to the mobile and landline telephone terminals of the subscriber; and a computer processor, operably connected to said memory device, for accessing and analyzing each call screen list stored within said memory device;

wherein call screen list based telephony services are provided to said first telephone terminal according to analysis of said each call screen list, irrespective of the telephone terminal of the subscriber for which the telephone call received was intended.

32. The apparatus according to claim 31, wherein call screen list based services defined by a call screen list stored by said memory device comprise at least one service from the group consisting of call screen acceptance, call screen rejection, call screen selective call forwarding, call screen selective voicemail forwarding, home/roam call screen services, and conditional call screening services.

33. The apparatus according to claim 31, wherein said memory device is operably connected by a connection selected from the group consisting of a local bus connection and a remote connection through a communications link.

34. The apparatus according to claim 31, wherein said computer processor further provides a subscriber user interface for configuring said each call screen list associated with the mobile and landline telephone terminals of a subscriber and the call screen list based services defined by said each call screen list.

35. An apparatus for selectively providing integrated call screen list based services to a subscriber having both mobile and landline telephony service subscribers, comprising:

means for receiving requests to provide call screen list based telephony services to a first telephone terminal of the subscriber receiving a telephone call, said first telephone terminal selected from the group consisting of a mobile telephone terminal and a landline telephone terminal;

means for storing each call screen list associated with telephony services provided to the mobile and landline telephone terminals of the subscriber, said means for storing operably connected to said means for receiving requests;

means for analyzing each call screen list to determine the call screen list based services provided to said first telephone terminal receiving the telephone call, said means for analyzing operably connected to said means for storing; and means for providing call screen list based services to said first telephone terminal according to the analysis of said each call screen list, irrespective of the telephone terminal of the subscriber for which the telephone call received was intended, said means for providing operably connected to said means for analyzing.

36. The apparatus according to claim 35, wherein a second telephone terminal of the subscriber not intended to receive the telephone call is also selected from the group consisting of a mobile telephone terminal and a landline telephone terminal, further comprising means for providing telephony services to said second telephone terminal, operably connected to said means for storing.

37. The apparatus according to claim 35, further comprising means for sending requests to provide call screen list based telephony services for said first telephone terminal, operably connected to said means for receiving.

38. An apparatus for selectively requesting integrated call screen list based services for a subscriber having both mobile and landline telephony services, comprising:

means for receiving a telephone call intended for a first telephone terminal of the subscriber, said first telephone terminal selected from the group consisting of a mobile telephone terminal and a landline telephone terminal;

means for requesting call screen list based telephony services for said first telephone terminal receiving the telephone call; and means for storing each call screen list associated with telephony services provided to the mobile and landline telephone terminals of the subscriber, said means for storing operably connected to said means for receiving and said means for requesting;

means for analyzing said each call screen list associated with the mobile and landline telephone terminals of the subscriber; and means for providing call screen list based services to said first telephone terminal receiving the telephone call, according to the analysis of said each call screen list, irrespective of the telephone terminal of the subscriber for which the received telephone call was intended.

39. The apparatus according to claim 38, further comprising means for receiving requests for call screen list based services to be provided to said first telephone terminal, operably connected to said means for requesting.

* * * * *